*INVENTOR*
Alfred Beck

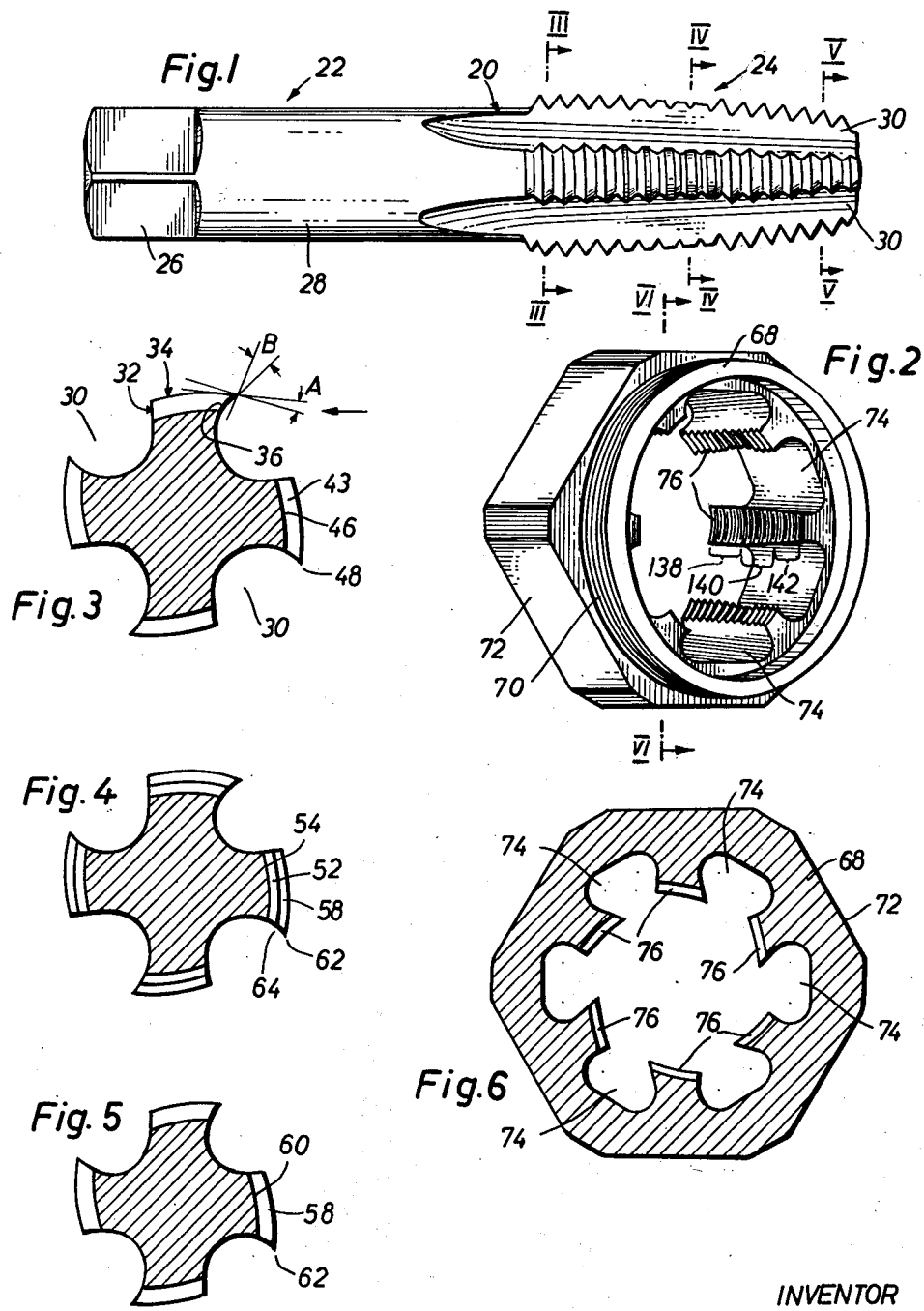

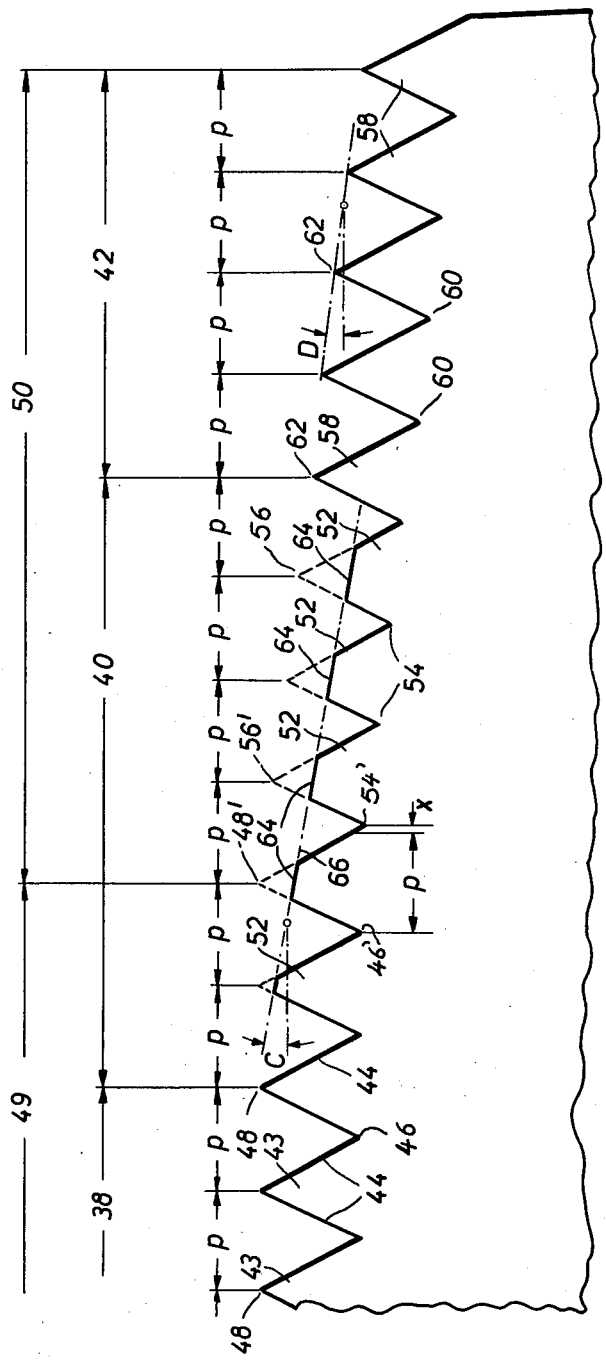

INVENTOR
Alfred Beck,
BY
Att'y

United States Patent Office 3,125,772
Patented Mar. 24, 1964

3,125,772
CYLINDRICAL THREAD CUTTING TOOL HAVING A CHAMFERED REAR SECTION ON THE FORWARD CONICAL THREAD CUTTING PORTION
Alfred Beck, Hompeschstrasse 8, Dusseldorf, Germany
Filed Dec. 15, 1959, Ser. No. 859,799
2 Claims. (Cl. 10—111)

My invention relates to threading tools of the type usually referred to as taps and threading dies and capable of cutting a thread of the well-known V-type. Such tools are extensively used in manual operation as well as in machines, the tap being the male type and the die the female type.

In order to tap a hole or to cut a thread into the surface of a bolt it is often found necessary to make the thread in several steps, and the tool manufacturers therefore provide a set of taps, or dies, for each diameter of a certain type of thread. Any such set comprises a minimum number of two and sometimes up to five individual tools with a progressive increase in size; this is evidently very inconvenient, especially in machine work.

To avoid the said disadvantage threading tools have been used which comprise in their threaded region two portions, i.e., a chamfered portion and an adjoining cylindrical portion. While it has been customary to let the thread run through the threaded region from end to end without any change in the minor diameter, it has also been suggested to retain the full depth of the thread over the entire length of the chamfered portion. It is shown in my copending applications for patent Serial No. 594,150, filed June 27, 1956, now Patent No. 2,979,741, issued April 18, 1961, and Serial No. 746,010, filed July 1, 1958, now Patent No. 3,023,546, issued March 6, 1962, how the particular geometrical requirements may be fulfilled which have to be met in such tools. Threading tools made as shown in those applications, if used under average conditions, have been found capable of cutting a thread within one step, thus requiring not more than a single tool for a given diameter. However, if the material to be threaded is comparatively hard, or brittle, or if a rather high threading speed is required, or if the conditions are severe for other reasons, even these tools may fail.

It is one object of my invention to provide a threading tool of the type referred to, which has the capability when applied to the cylindrical surface of a hole or bolt of producing a finished V-thread.

It is another object of my invention to provide a threading tool of the type referred to, which is capable of making a finished V-thread when applied to the cylindrical surface of a hole or bolt consisting of a piece of material of considerable hardness.

It is a further object of my invention to provide a threading tool of the type referred to, which is capable of producing a finished V-thread when applied to the cylindrical surface of a hole or bolt even if the threading speed exceeds average values.

It is a still further object of my invention to provide a threading tool having the capability or capabilities mentioned, which may be produced in a simple and inexpensive way.

I have shown two preferred embodiments of my invention in the accompanying drawings in a simplified and diagrammatical way. In the drawings FIG. 1 is a perspective view of a tap shaped according to my invention.

FIG. 2 is a perspective view of a threading die shaped according to the invention.

FIG. 3 is a transverse section taken along the line III—III of FIG. 1 in a slightly enlarged scale.

FIG. 4 is a transverse section taken along the line IV—IV of FIG. 1 in the scale of FIG. 3.

FIG. 5 is a transverse section taken along the line V—V of FIG. 1 in the scale of FIG. 3.

FIG. 6 is a sectional view of the threading die shown in FIG. 2, taken along the line VI—VI in FIG. 2.

FIG. 7 is a schematic representation in a highly enlarged scale of the threading portion of either the tap or the die shown in the preceding figures, as viewed in the direction of arrows VII in FIGS. 3 and 6.

Figure 8:
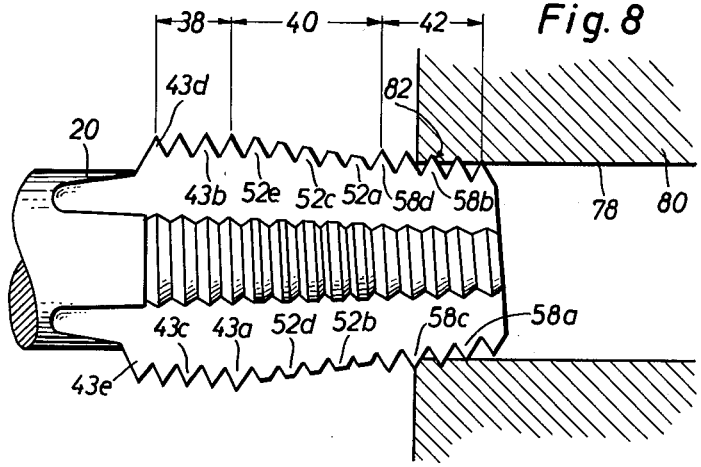
FIG. 8 is a side view of a tap having a threaded portion as shown in FIG. 7, the tap being shown in the initial phase of tapping a hole.

The general configuration of the tap shown in FIG. 1 and the die shown in FIG. 2 is that of a standard tap or die as described for example in "Machinery's Handbook," in its section headed "Taps and Threading Dies," The Industrial Press, New York 13, N.Y. The tap shown in FIGS. 1, 3 to 5 and 8 and generally designated 20, consists of two major portions, a portion 22 forming the left-hand end and usually called the shank, and a threaded portion 24. The shank 22 comprises two regions 26 and 28, namely the end region 26 being square in cross-section and the inner region 28 being circular in cross-section. Four longitudinal flutes 30, best seen in FIGS. 3 to 5, extend over the entire length of the threaded portion 24 and into part of the shank portion 22. These flutes divide each full turn of the helix forming the thread into four sections each representing an individual cutting tool, hereafter called tooth and generally designated 32 in FIG. 3, its perimeter 34 being so shaped as to yield the required clearance angle A and its front 36 being so inclined as to yield the required rake angle B.

The tool as far as described before does not differ from customary tools. Its new features are in the threaded portion 24, as schematically shown in FIG. 7. This portion, in accordance with the invention, is comprised of three regions, namely, the back region 38, the intermediate region 40 and the forward region 42.

FIG. 7 is a side view of the threaded portion, the contours shown being identical with those which would appear in a section taken in the axial plane. In this view the V-thread comprises a series of teeth, the sides of which are inclined to each other by the thread angle (equaling 60° in any ASA thread), the internal intersection of adjacent sides forming the root and the external intersection of adjacent sides forming the point of the tooth. In order to be able to represent the thread in as large a scale as possible, the back region 38 is shown partly broken away, and the number of teeth in the forward region 42 is less than in FIG. 1. The sides of the teeth 43 lying in region 38 are designated 44, while their roots are designated 46. The teeth in this region are pointed, the points 48 also being visible in FIG. 3.

The configuration of the threaded portion 24 will be best understood if the middle region 40 is disregarded for the moment. To facilitate the understanding the teeth in the middle region are completed to their full size by dotted lines in FIG. 7. If the threaded portion 24 is regarded under the assumption that the teeth in the middle region 40 are shaped as shown by the dotted lines, this region 24 will appear to consist of two rather than three regions, a cylindrical region 49 extending over a greater axial distance than region 38, and a conical region designated 50. The teeth in these two regions are cut each to form a full V, the partly dotted teeth 52 in region 50 having roots 54 and points 56, and the teeth 58 in region 42 having roots 60 and points 62, all the V's having the same angle equaling the thread angle.

It is important to note that the distance between the points of adjacent or consecutive teeth is the same over the entire threaded portion 24, and is equal to the pitch $p$ of the thread to be tapped by the tool. Hence, the distance between any two teeth, selected arbitrarily from any region, is equal to the product $np$, where $n$ is an integer. The same, however, does not apply to the roots. It is shown in FIG. 7 that over the one turn of the thread which forms the transient from region 49 to region 50 the distance between the adjacent roots 46' and 54' is greater than the pitch $p$ by an amount $x$. Care should be taken while making the tap that this amount does not appear in the distance between the points 48' and 56' of the transient turn just mentioned, which would make the tool useless, and I recommend to make use of the methods disclosed in my copending applications for patent referred to above, which methods give the certainty that the correct geometrical configuration is obtained.

The product of the methods disclosed in the applications for patent just mentioned is a tap or die in which the teeth in region 40 are shaped as shown in dotted lines in FIG. 7. In the tap according to the present invention, however, this middle region is chamfered, and the actual teeth 52 in this region thus have edges 64 instead of points, the length of the edges increasing from left to right in FIG. 7. It will be noted that the chamfer (indicated by the dash-dot line 66) extends into the cylindrical region 49, its major portion, however, lying in the conical region 50.

Before demonstrating how a tool according to the invention operates when producing a thread I wish to explain the particulars of the die shown in FIGS. 2 and 6. The body of this die is a ring-shaped member 68 whose outer surface comprises a cylindrical region 70 and a hexagonal region 72, the latter allowing the application of a suitable wrench in the usual manner. The inner surface of member 68 is threaded, the threads being interrupted by six flutes 74. It will be seen from FIG. 6 that, due to these flutes, six series of teeth 76 are formed having the required clearance angle and rake angle and corresponding to the four series of teeth of the tap described above and shown in FIGS. 1 and 3 to 5.

As in the tap described above the thread of the die shown in FIGS. 2 and 6 comprises three regions, a cylindrical region 138 in which the teeth are pointed, an adjacent region 140 having its teeth chamfered and an adjacent conical region 142 with pointed teeth. Viewed as indicated by arrow VII in FIG. 6 and then shown in an enlarged scale one of these series of teeth would just repeat what has already been shown in FIG. 7. Those skilled in the art will therefore be able to understand the configuration of the threaded portion of the die by using the information given in FIG. 7.

The operation of a threading tool according to the invention is illustrated in FIGS. 8 to 18, FIG. 8 showing a tap having a thread of the configuration shown in FIG. 7, the scale however being reduced by about 1:4. In FIG. 8 the tap is shown entering a whole 78 of some given work 80. It is assumed for the following that the very first turn of the helix comprising the thread does not catch to any appreciable extent, and that the removal of material from the work 80 starts when the second turn enters the hole 78. With each turn comprising four teeth each full revolution of the tap will initiate four chips in succession. It is important to note the shape of these chips in their cross-section, and the shape of the individual cross-sections have therefore been illustrated in FIGS. 9 to 18 in a scale about 16 times the scale of FIG. 8 and 4 times the scale of FIG. 7.

Figures 9, 10, 11, 12:
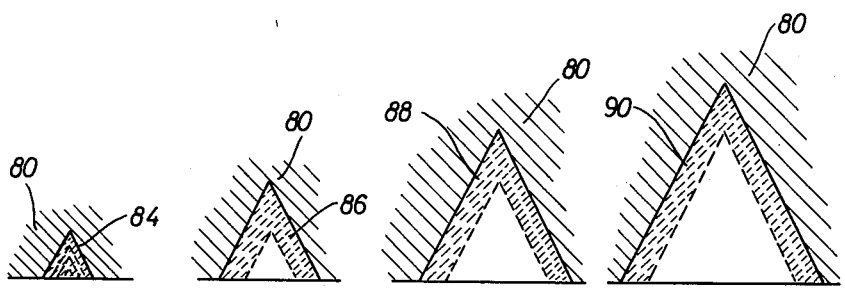
FIGS. 9 to 18 are diagrams showing the development of a thread made by a threading tool according to the invention.

The very first tooth to cut into the material (which tooth under the above assumption is on the second turn designated 58a in FIG. 8) will cut a chip of triangular shape, this chip being represented in FIG. 9 by the innermost triangle. The next tooth will then cut a chip which is also of triangular shape, but is hollow because part of this triangle had been removed by the preceding tooth. Similarly, the third and fourth tooth will also cut hollow triangles from the work, all these chips being shown in FIG. 9 in dotted lines. FIG. 9 thus represents the situation after the first turn has cut into the work at one particular place and started forming a V-shaped groove at this particular place, say the groove designated 82 in FIG. 8, by removing a triangular area 84.

Considering that the teeth in one turn of the helix are similar to each other it will be obvious that the chips cut by these teeth will also be similar to each other. Hence, the next turn 58b will remove from groove 82 a total of four chips corresponding to the area designated 86 in FIG. 10. The same is true with respect to the action of the teeth in the succeeding turns 58c and 58d, which will remove areas 88 and 90 from the said groove, as illustrated in FIGS. 11 and 12.

Figure 13:
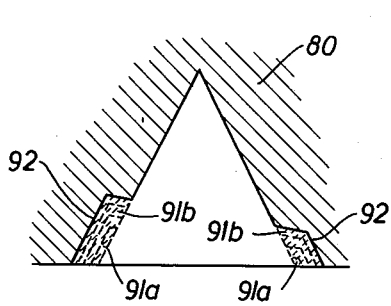
Figure 14:
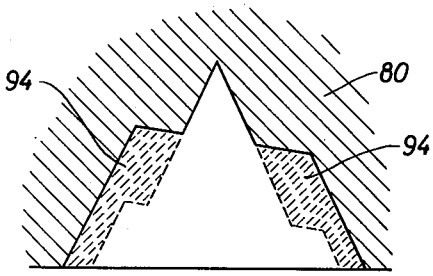
Figure 15:
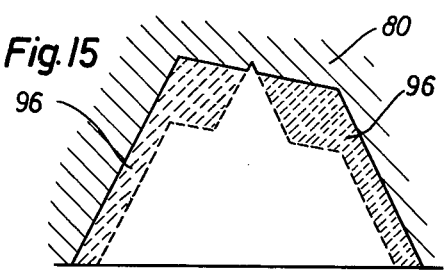

After the teeth of the final turn 58d of region 42 have been operating in groove 82, the teeth 52 of the adjoining chamfered region 40 will enter the groove and start cutting out chips of an entirely different shape, as is shown in FIGS. 13 to 15.

The first tooth of the four teeth in the first turn 52a of the chamfered region 40 will now cut out of groove 82 (or any other groove of the work 80) a pair of chips each in the form of a simple scale, and the teeth of that same turn subsequently cutting into the groove will produce pairs of angular chips, all these chips being shown in cross section in FIG. 13, where the initial scales are designated 91a and the following angular chips 91b. The total areas removed by turn 52a of region 40 are a pair of trapezoids 92, one on each side.

The teeth in the next following turns of region 40 will produce angular chips only, the turns 52b and 52c thus cutting out areas 94 and 96, as shown in FIG. 14 and FIG. 15.

Figure 16:
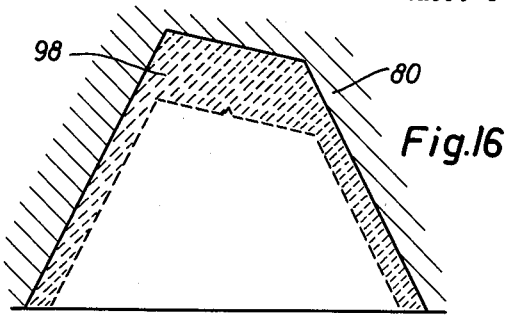
Figure 17:
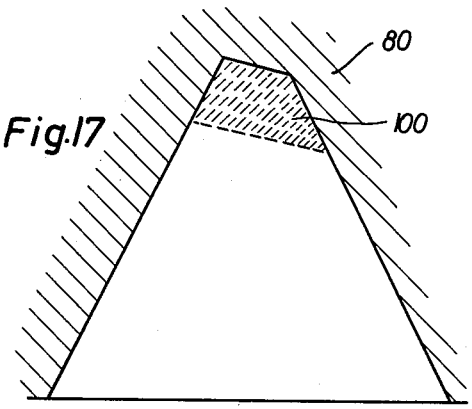
Figure 18:
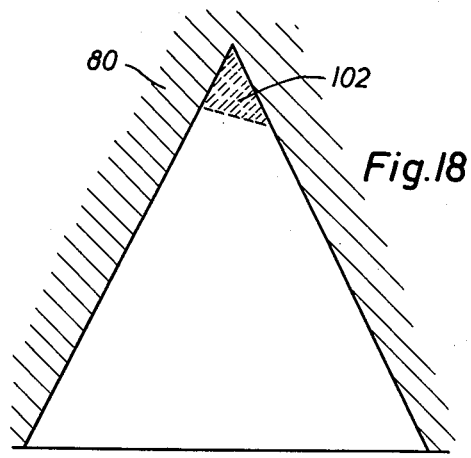

The shape of the chips will again change when the teeth in turn 52d cut into the groove, these teeth producing chips as shown in FIG. 16 having the shape of an inverted and somewhat distorted U, designated 98 in FIG. 16. The four teeth of the remaining turn 52e of the chamfered region 40 will thereupon cut into the groove and remove from it material in the form of a chip of the simple trapezoid shown in FIG. 17 and designated 100.

The cylindrical region 38 will thereafter become active, and the four teeth of its first turn 43a wil cut from the groove the final triangle 102, necessary to complete the required shape. The teeth of the turns 43b, 43c, 43d and 43e subsequently entering the groove will then have a finishing effect, increase the smoothness of the sides and eliminate any irregularities which may have occurred during the comparatively rough cutting preceding this final phase.

It will have been noted from FIGS. 9 to 12 that the amount of material removed from the work during the initial phase of the operation, comprising five full revolutions of the tap, in the example shown, increases from one revolution to the next, but that it is nevertheless relatively small, especially in the very first cuts. While initially operating at a small amount of load and torque the tool is thus capable of centering itself accurately to the axis of the hole to be tapped and simultaneously cutting the initial turns of the thread with a high degree of precision. Continuing in this way the points of the tool in the conical region 42 will successively enter the hole, cut into the material rather deep radially and thus prevent the tool from deviating in axial direction. The cross-section of the chips will increase continuously, then once more drop when the chamfered region 40 enters the hole and then again increase considerably, and it will reach its maximum somewhere within this region, as may be seen from FIGS. 15 and 16. During the final phase of the chamfered region and the first turn of the cylindrical region the chips become smaller and smaller, which is in full agreement with the requirement that during the final revolutions the surfaces of the threads are to be finished only.

My improved threading tool, regardless of whether it is a tap or a die, thus operates in three phases: a first or advance phase in which the helix of the thread to be produced is fixed by sharp, pointed teeth cutting into the work. The load to overcome during this first phase is small and there is therefore no danger that the tool deviates in any direction; a second phase in which the tool removes a considerable amount of material in each revolution. This second phase may be called the roughening phase. Yet, despite the increased load there is still no danger of any deviation occurring because the tool is safely guided by the threads made by the teeth during the first or advance phase; and a third phase in which the amount of material removed in each revolution again drops to small amounts, this region thus being the finishing phase.

The number of turns in each of the three regions 38, 40 and 42 may be varied within wide ranges, depending among other factors upon the thread diameter and the material to be worked on. In general, however, I have found that under average conditions the best results are often obtained with taps or dies having 2 to 5 turns in region 38, 5 to 8 turns in region 40 and 6 to 8 turns in region 42. These numbers do not apply, however, when blind holes have to be tapped, in which case the number of turns in region 42 should be reduced to 3 or 4, while the numbers of turns in the remaining regions should also be one half of the numbers just mentioned.

To a certain degree the angles of the two frustoconical surfaces, one forming the chamfer in region 40 and the other one containing the points of the teeth in region 42, depend upon the numbers of turns in these regions. These angles may, however, be selected freely within certain limits, and I recommend to let the angle of the chamfer in region 40 not be less than 6 degrees and not to exceed 14 degrees. This angle is to be measured between line 66 and a parallel to the axis, as shown in FIG. 7, where this angle is designated C. The angle D of the frustoconical surface in region 42 is preferably selected to equal about two thirds of angle C. Angle D is also measured versus the axis, as shown in FIG. 7. Here, again, larger angles should be provided in taps for blind holes, angle C then preferably equalling about 22 degrees.

Concerning the clearance angle A and the rake angle B, I recommend to use conventional values as they may be found in textbooks. It should be mentioned, however, that angle A, for greater clarity, is shown exaggerated in FIGS. 3 to 6.

Finally I wish to show one suitable and simple method of making tools according to the invention, so that they meet what may be called the pitch requirement, which requirement states that the distance between any two points in regions 38 and/or 42 must equal a whole multiple of the pitch. This method, which does not form part of the invention, is illustrated in FIGS. 19 to 21 in a purely schematical way.

Figures 19, 20, 21:
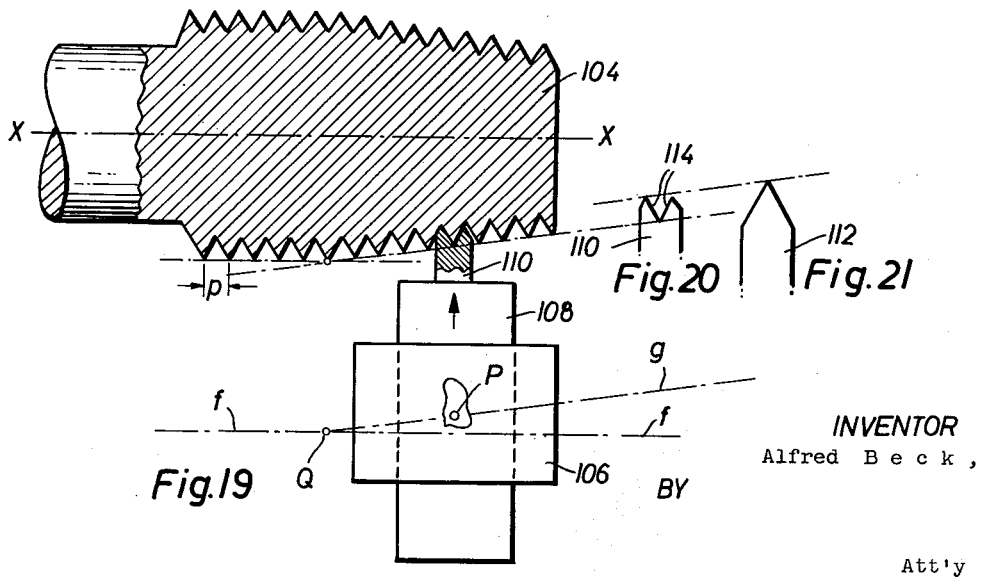
FIG. 19 illustrates in a simplified schematic way a method suitable for making threading tools according to the invention.
FIG. 20 illustrates the profile of a tool used in the method illustrated in FIG. 19.
FIG. 21 illustrates the profile of a tool as it should not be used in the said method.

FIG. 19 shows a longitudinal section of a tap 104 of the kind shown in FIG. 7 and in the process of being threaded. It is assumed that the tap 104 is rotated on a lathe about its axis X—X, while a support 106 carrying a tool holder 108, is moving parallel to the axis X—X at a rate corresponding to the pitch p of the thread. In other words, the support 106 is travelling over a distance equalling p while the tap 104 makes one full revolution.

The tool holder 108 is movably mounted in radial direction in the support 106.

Fixed to the tool holder is a profiled tool 110, adapted to cut the required thread into the tap. P is a reference point on the tool holder.

In the first phase of the motion of the support 106 the tool holder 108 is not moving radially and its reference point P will thus travel along a path $f$ running parallel to the axis X—X, this first phase corresponding to region 49 in FIG. 7. When the reference P on the tool holder reaches point Q on the path $f$ the tool holder 108 is caused by suitable guide means to move radially and inwardly at a constant rate. Thus, while the support 106 continues on path $f$ the tool holder travels along an inclined path $g$.

All this is of course the old and obvious method of using a lathe for making parts consisting of a cylinder and an adjoining cone. What matters here is the particular profile of the tool 110. One would be inclined to use as a tool the simple, straight-sided single-point tool 112 shown in FIG. 21. In that way, however, the pitch requirement could not be met. There are several ways to meet this requirement, and one of the simplest is the use of a tool according to FIGS. 19 and 20. The important feature of tool 110, whose profile is shaded in FIG. 19 and shown once more separately in FIG. 20, is that its two sides 114 form an open V, appearing inverted if compared with the closed V of the tool shown in FIG. 21.

I claim:

1. A threading tool namely a tap or die for cutting cylindrical V-shaped screw threads comprising in combination
    (a) an initial conical rough cutting section composed of a forward and a rearward portion;
    (b) an inwardly thereof continuing cylindrical finish cutting section;
    (c) a plurality of longitudinally extending flutes forming a plurality of V-shaped teeth in said two sections, the distance betwen any two points of neighboring V-shaped teeth, when measured in axial direction of the tool, being equal to the pitch of the thread to be cut;
    (d) the teeth in the forward portion of said rough cutting section being of substantially full thread depth and the teeth in the rearward portion of said rough cutting section being chamfered along a conical surface tapering away from said cylindrical finish cutting section at a larger angle than that of the conical rough cutting section, so that the said chamfered teeth cut with continuously increasing depth into the thread precut by the fully profiled teeth of the forward portion of the rough cutting section thereby preparing and lessening the labor of the immediately following finish cutting section.

2. A threading tool according to claim 1 wherein the said conical tapering surface extends into the forward portion of the cylindrical finish cutting section, thereby tapering the teeth in this forward portion in addition to the teeth in said rearward portion of the rough cutting section.

References Cited in the file of this patent

UNITED STATES PATENTS

| 1,770,585 | Steinruck | July 15, 1930 |
| 2,908,022 | Strobel | Oct. 13, 1959 |

FOREIGN PATENTS

| 253,102 | Great Britain | 1927 |
| 584,682 | Great Britain | Jan. 21, 1947 |
| 487,493 | Italy | Dec. 2, 1953 |
| 523,922 | Italy | Apr. 19, 1955 |
| 1,144,904 | France | Dec. 29, 1957 |